Patented Dec. 17, 1940

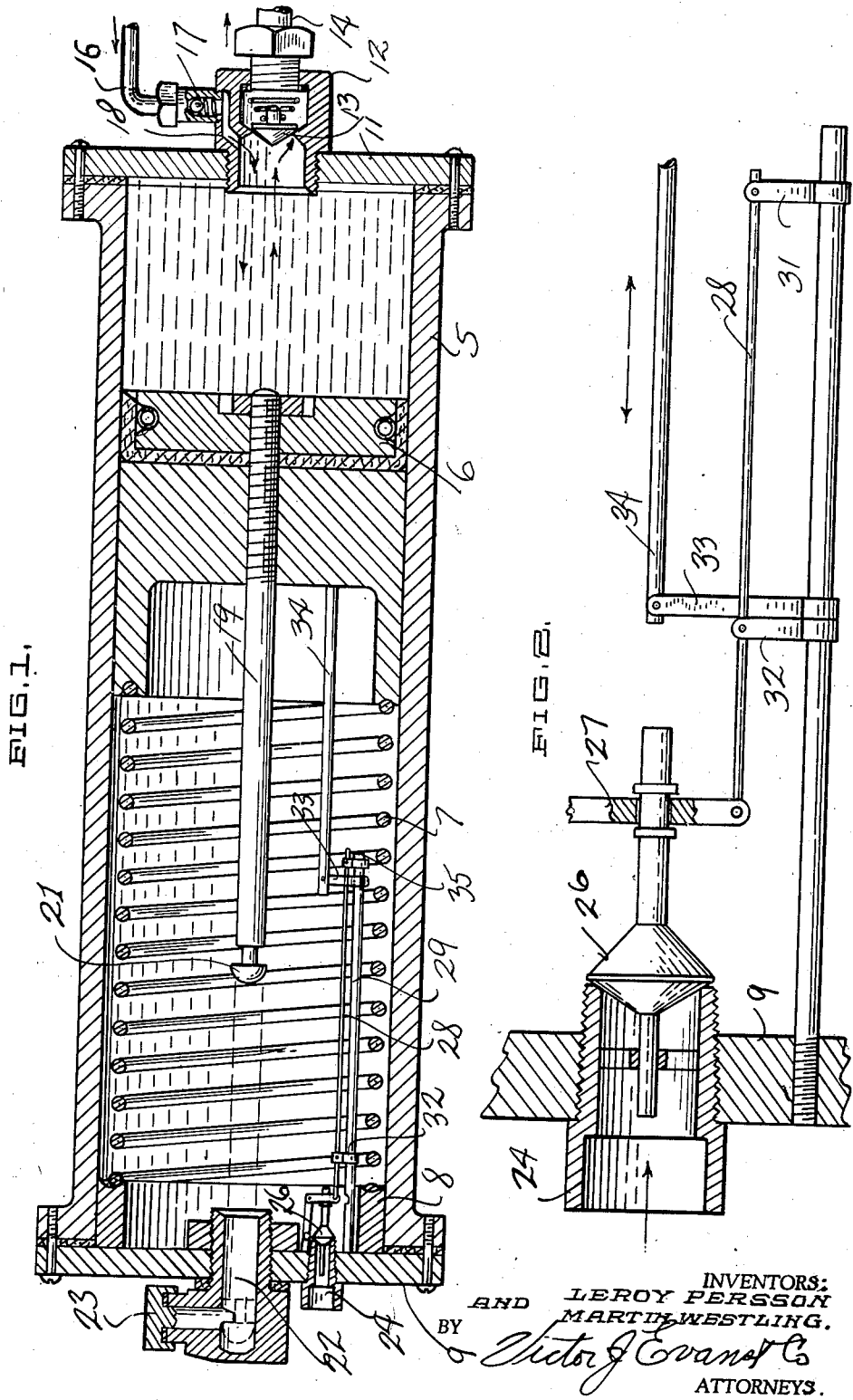

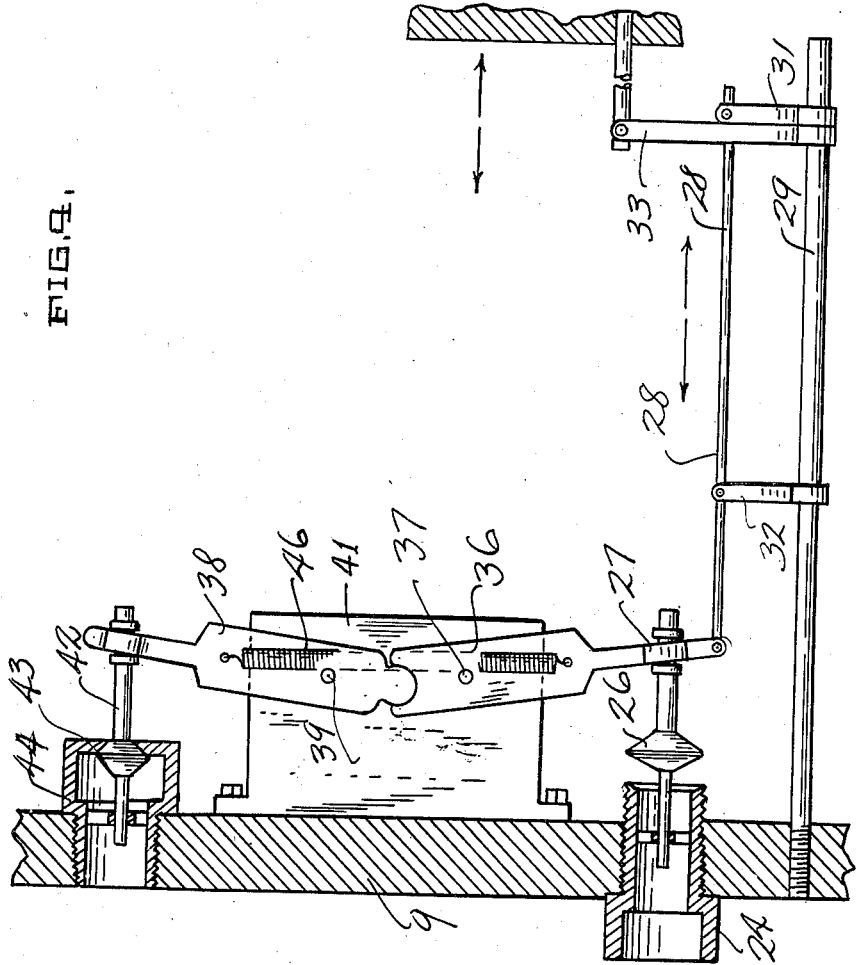

2,225,539

UNITED STATES PATENT OFFICE 2,225,539

MOTOR LUBRICATING DEVICE

Leroy Persson and Martin Westling,
San Luis Obispo, Calif.

Application March 10, 1939, Serial No. 261,052

5 Claims. (Cl. 123—196)

This invention relates to improvements in motor lubricating devices and has particular reference to a device for quickly lubricating the bearings of a motor vehicle when the vehicle is first started.

A further object is to produce a device of this character which may be readily installed upon the motor vehicle without materially altering the arrangement of parts.

Other objects and advantages will be apparent during the course of the following description.

In the accompanying drawings forming a part of this specification and in which like numerals are employed to designate like parts throughout the same, Fig. 1 is a cross sectional view of the cylinder of our device;

Fig. 2 is an enlarged fragmentary detailed view of the suction valve operating mechanism;

Fig. 3 is an end elevation of the cylinder; and

Fig. 4 is an enlarged detailed cross sectional view taken on the line 4—4 of Fig. 3.

It is highly important to properly lubricate an engine, particularly when the engine is first started, as the oil has drained away from the parts, which parts need lubrication in order to prevent undue wear.

In the accompanying drawings wherein for the purpose of illustration is shown a preferred embodiment of our invention, the numeral 5 designates a cylinder within which is mounted a piston 6 having a spring 7 engaging one end of the piston and having its opposite end bearing against the ring 8, abutting the head 9, it being understood that the head 9 holds the end of the cylinder 5, as does the head 11, attached to the opposite end of the cylinder. A fitting 12 has a spring pressed valve 13 therein which prevents the flow of oil from the pipe 14. A pipe 16 has a check valve 17 and communicates through a passage 18 to the interior of the cylinder. The piston 6 carries a rod 19 having a head 21 which enters a bore 22 and is adapted to have the head engaged by a pin 23, whereby the piston will be held against the tension of the spring 7 until released. A fitting 24 connects the suction line of the engine to the interior of the cylinder back of the piston. This fitting is closed by a valve 26, having one end supported by a yoke 27, which yoke is connected to a rod 28, slidably supported by a rod 29, the slidable supports being shown at 31 and 32. A slider 33 is connected by a rod 34 to the back of the piston 6. The yoke 27 is attached to a member 36, pivoted as at 37, and having a bifurcated end which engages the end of a member 38, pivoted as at 39 to a support 41. The member 38 engages the end of a valve rod 42, carrying an outlet valve 43, maintained in the fitting 44. A spring 46, attached to the members 36 and 38 at a point beyond their pivots, effects a toggle action between the two members when they pass dead center.

The result of this construction is that when the device is attached to a vehicle and the engine is started, any desired means, such as a mechanical lift, will release the catch 23, with the result that the spring 7 forces the piston 6 toward the right of the drawing. The oil within the cylinder will escape past the valve 13 and through the pipe 14 to the parts to be lubricated. As soon as the piston has moved a predetermined distance, the slider 33 will engage the sliding support 31, pulling the rod 28, and, consequently, the yoke 27, so as to open the valve 26, permitting vacuum from the engine to enter behind the piston 6. At the same time, the valve 43 will be closed through the toggle action of the members 36 and 38. The piston 6 will now return toward the left of the drawing, drawing oil into the pipe 16 and past the check valve 17. When the head 21 of the rod enters the bore 22, it will be engaged by the pin 23, and at the same time, the slider 33 will have engaged the support 32, locking the member 36 upon its pivot, closing the valve 26, and opening the valve 43, thus destroying the vacuum and releasing the piston therefrom, ready to be forced forward by the spring when the member 23 is again lifted.

Thus it will be seen that we have produced a device which will automatically operate at each starting of the engine and force lubrication to any desired point.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. In a device of the character described, comprising a cylinder, an oil inlet having an outwardly closing valve, an oil outlet for said cylinder having an inwardly closing valve, a piston mounted in said cylinder, a spring within the cylinder and engaging one end of the piston and normally forcing the piston towards one end of the cylinder, a vacuum connection with the cylinder for drawing the piston towards one end of the cylinder against the tension of the spring, an outwardly closing valve for said vacuum connection, a rod carried by the cylinder, a latch engaging the rod and holding the piston against the tension of the spring, a vent port carried by the cylinder adjacent the vacuum connection, and means operated by the movement of the piston in one direction in the cylinder for simultaneously closing the vacuum valve and opening the vent port, whereby the vacuum in the cylinder is broken.

2. In a device of the character described, comprising a cylinder, an oil inlet having an outwardly closing valve, an oil outlet for said cylinder having an inwardly closing valve, a piston mounted in said cylinder, a spring within one end of the cylinder and engaging the piston and normally forcing it towards the opposite end of the cylinder, a vacuum pipe connected to the cylinder for drawing the piston towards the end thereof, an outwardly closing valve controlling said vacuum pipe, a rod carried by the cylinder, a latch engaging the rod and holding the piston against the tension of the spring, a vent port carried by the cylinder adjacent the vacuum connection, a valve for closing said vent port, and means carried by the piston for simultaneously closing the valve of the vacuum pipe and opening the valve of the vent port by the movement of the piston in one direction and reversing the valves by the movement of the piston in the opposite direction.

3. In a device of the character described, comprising a cylinder, an oil inlet having an outwardly closing valve, an oil outlet for said cylinder having an inwardly closing valve, a piston in said cylinder, a spring within one end of the cylinder and engaging the piston and forcing it towards the opposite end of the cylinder, a vacuum pipe connected to the cylinder for drawing the piston towards the end and compressing the spring, an outwardly closing valve within the cylinder for closing the vacuum pipe, a rod carried by the cylinder and passing through the cylinder head, a latch for engaging said rod and holding the piston against the tension of the spring, a vent port adjacent the vacuum pipe, a valve closing said vent port within the cylinder, an intermediately pivoted lever in the end of the cylinder and connected to the vent valve, an intermediately pivoted lever carried by the cylinder and connected to the vacuum pipe valve and interlocked with the intermediately pivoted lever of the vent valve, and means carried by the piston for engaging the intermediately pivoted lever of the vent valve for opening the same when the piston reaches the limit of its movement which simultaneously rocks the vacuum pipe valve lever and closes the vacuum pipe by the movement of the piston in one direction and reversing the valves by the movement of the piston in the opposite direction.

4. In a device of the character described, comprising a cylinder, an air inlet valve for said cylinder, an oil inlet having an outwardly closing valve, an oil outlet for said cylinder having an inwardly closing valve, a piston mounted in said cylinder, a spring within the cylinder and engaging one end of the piston for normally forcing the piston toward one end of the cylinder, a vacuum connection through the cylinder for drawing the piston toward one end of the cylinder against the tension of the spring, an outwardly closing valve for said vacuum connection, a rod carried by the piston, a latch carried by the cylinder and engaging the rod and holding the piston against the tension of the spring, a link connection between the air inlet valve and the vacuum valve for simultaneously opening one valve and closing the other, and means carried by the piston for operating the link connection upon the movement of the piston in both directions.

5. In a device of the character described, comprising a cylinder, an air inlet valve for said cylinder, an oil inlet and outlet valve at one end of the cylinder, a piston mounted in said cylinder, a spring within the cylinder at the opposite end from the oil inlet and outlet and engaging the piston for normally forcing the same toward the opposite end of the cylinder, a vacuum connection through the cylinder for drawing the piston towards one end of the cylinder against the tension of the spring, an outwardly closing valve for said vacuum connection, a rod carried by the piston, a latch carried by the cylinder and engaging the rod and holding the piston against the tension of the spring, a link connection between the air inlet valve and the vacuum valve for simultaneously opening one valve and closing the other, and means carried by the piston for operating the link connection upon the movement of the piston in both directions after a predetermined movement of the piston.

LEROY PERSSON.
MARTIN WESTLING.